United States Patent
Wang et al.

(10) Patent No.: US 7,434,239 B2
(45) Date of Patent: Oct. 7, 2008

(54) DISC PLAYER WITH OPENING AND CLOSING MECHANISM

(75) Inventors: He-Li Wang, Shenzhen (CN); Xiang-Hui Zhang, Shenzhen (CN); Wen-Jie Bao, Shenzhen (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 351 days.

(21) Appl. No.: 11/308,843

(22) Filed: May 15, 2006

(65) Prior Publication Data

US 2006/0277558 A1    Dec. 7, 2006

(30) Foreign Application Priority Data

Jun. 2, 2005    (CN)    .................... 2005 1 0035108

(51) Int. Cl.
*G11B 33/02*    (2006.01)
(52) U.S. Cl. .................................................. 720/655
(58) Field of Classification Search ................ 720/655; 361/683
See application file for complete search history.

(56) References Cited

U.S. PATENT DOCUMENTS

| 5,943,308 A | 8/1999 | Foo |
| 6,717,902 B2 | 4/2004 | Huang |
| 7,266,830 B2 * | 9/2007 | Zhang et al. ................. 720/655 |
| 7,286,343 B2 * | 10/2007 | Wang et al. ................. 361/683 |
| 2004/0062172 A1 | 4/2004 | Huang |
| 2005/0268314 A1 | 12/2005 | Dai |
| 2006/0053430 A1 * | 3/2006 | Zhang et al. ................. 720/655 |

FOREIGN PATENT DOCUMENTS

CN    2392240 Y    8/2000

* cited by examiner

*Primary Examiner*—Allen T Cao
(74) *Attorney, Agent, or Firm*—Winston Hsu (57) ABSTRACT

A disc player includes a base, a lid rotatably pivoted to the base, and an opening and closing mechanism secured to the base. The opening and closing mechanism includes a compression spring providing a restoration force and a pushing button for applying a pushing force thereon. The pushing button includes a locking portion for releasing the lid from the base and for clasping the lid to the base, and at least one wedged potion for interfering in one end of the compression spring to fix the compression spring.

14 Claims, 7 Drawing Sheets

DISC PLAYER WITH OPENING AND CLOSING MECHANISM

FIELD OF THE INVENTION

The present invention generally relates to a disc player and, more particularly, to a disc player with an opening and closing mechanism.

DESCRIPTION OF RELATED ART

Figure 7:
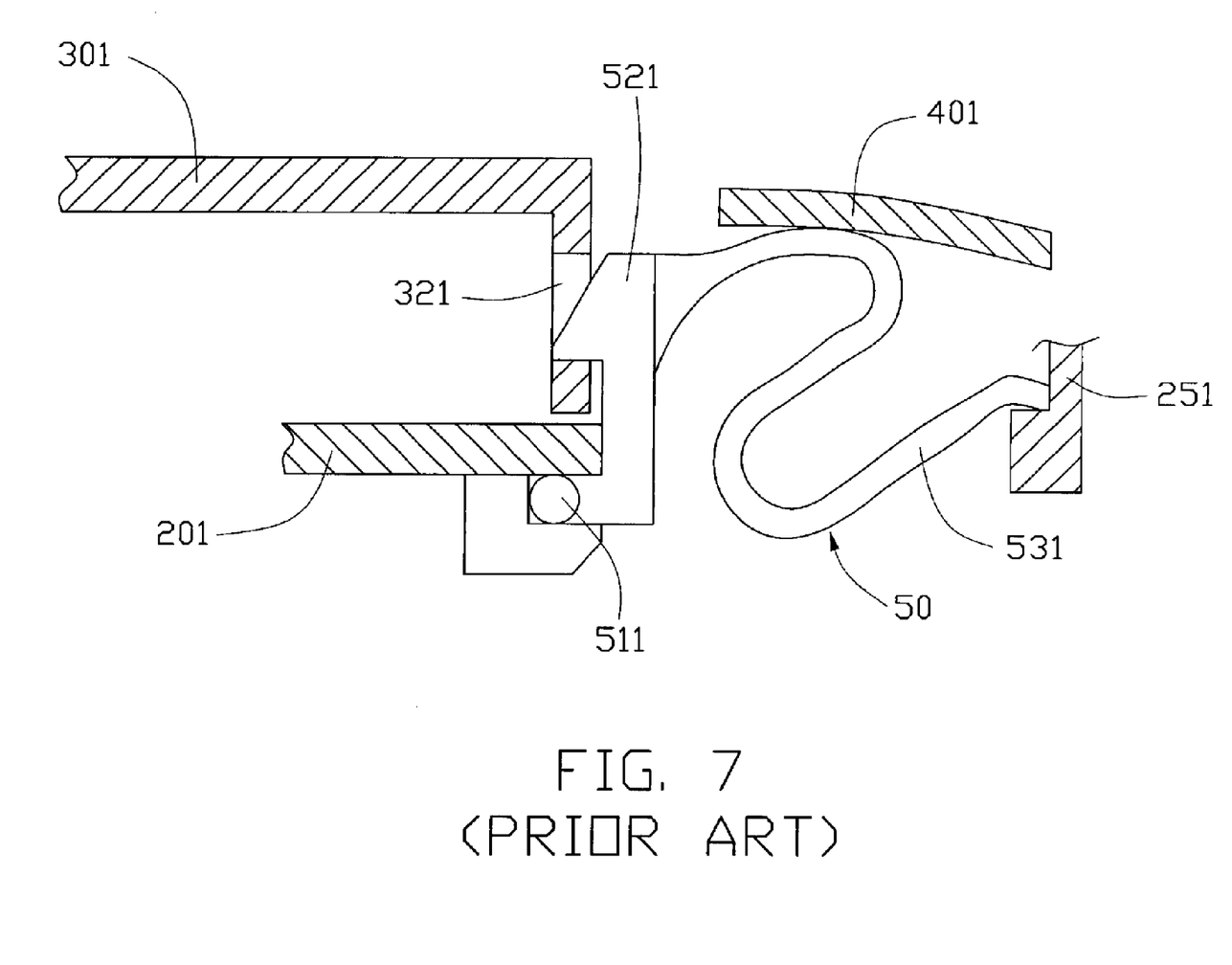
FIG. 7 is a cross-sectional view of part of an optical disc player having a conventional opening actuator.

In FIG. 7, a cross-sectional view of a part of a conventional optical disc player is shown. An opening actuator (not labeled) is located at a corner of a top lid 301. The opening actuator includes a press button 401 and a holding hook 50. The holding hook 50 includes a pivot portion 511, an L-shaped catch portion 521, and an S-shaped elastic portion 531. One end of the S-shaped elastic portion 531 is connected to a back of the L-shaped catch portion 521, and the other end of the S-shaped elastic portion 531 is connected to a stop wall 251. The pivot portion 511 is formed at one end of the L-shaped catch portion 521. The L-shaped catch portion 521 engages in a hole 321 defined in a side wall (not labeled) of the top lid 301. When a downward pressing force is applied to the press button 401, the S-shaped elastic portion 531 deforms. The catch portion 521 rotates about the pivot portion 511, and the L-shaped catch portion 521 exits the hole 321 so that the top lid 301 is released.

However, the press button 401 is liable to be accidentally actuated, for example if an object is dropped thereon or if a user mistakenly presses it instead of the correct functional button. When this happens, the top lid 401 is suddenly opened. If the optical disc player is running at the same moment, the rotating optical disc is liable to fly off and cause damage or injury. Furthermore, the S-shaped elastic portion 531 of the opening actuator is prone to become fatigued and lose its elasticity.

Accordingly, a need exists for an opening and closing mechanism in the industry to address the aforementioned deficiencies and inadequacies.

SUMMARY OF INVENTION

A disc player includes a base, a lid rotatably pivoted to the base, and an opening and closing mechanism secured to the base. The opening and closing mechanism includes a compression spring providing a restoration force and a pushing button for applying a pushing force thereon. The pushing button includes a locking portion for releasing the lid from the base and for clasping the lid to the base, and at least one wedged potion for interfering in one end of the compression spring to fix the compression spring.

Other systems, methods, features, and advantages of the present disc player will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF DRAWINGS

Many aspects of the present disc player can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION

Reference will now be made to the drawings to describe the preferred embodiments of the present disc player, in detail.

Figure 1:
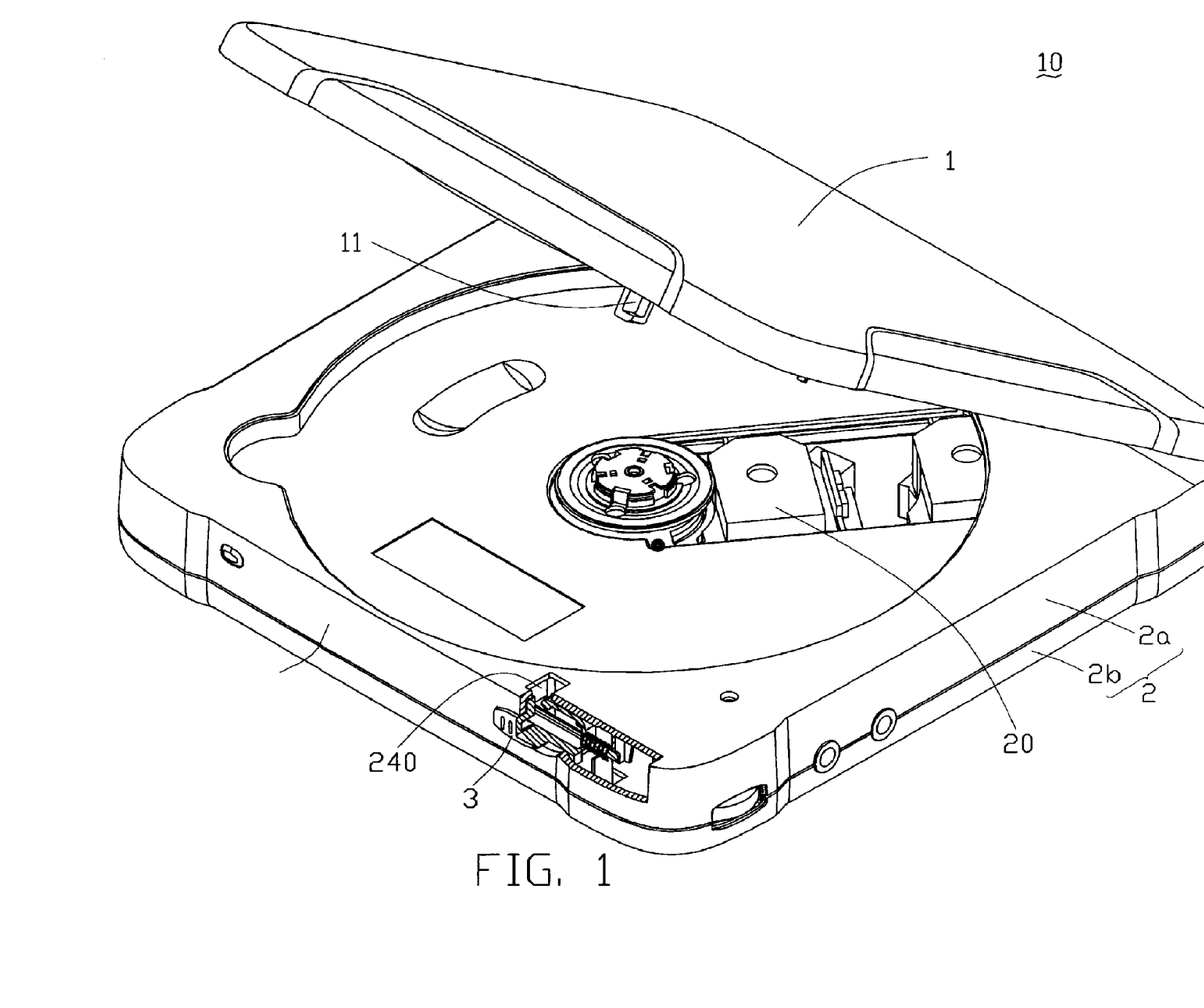
FIG. 1 is an isometric view of a disc player with an opening and closing mechanism in accordance with an exemplary embodiment thereof, the disc player including a lid and a base, the lid released at a certain angle.
Figure 2:
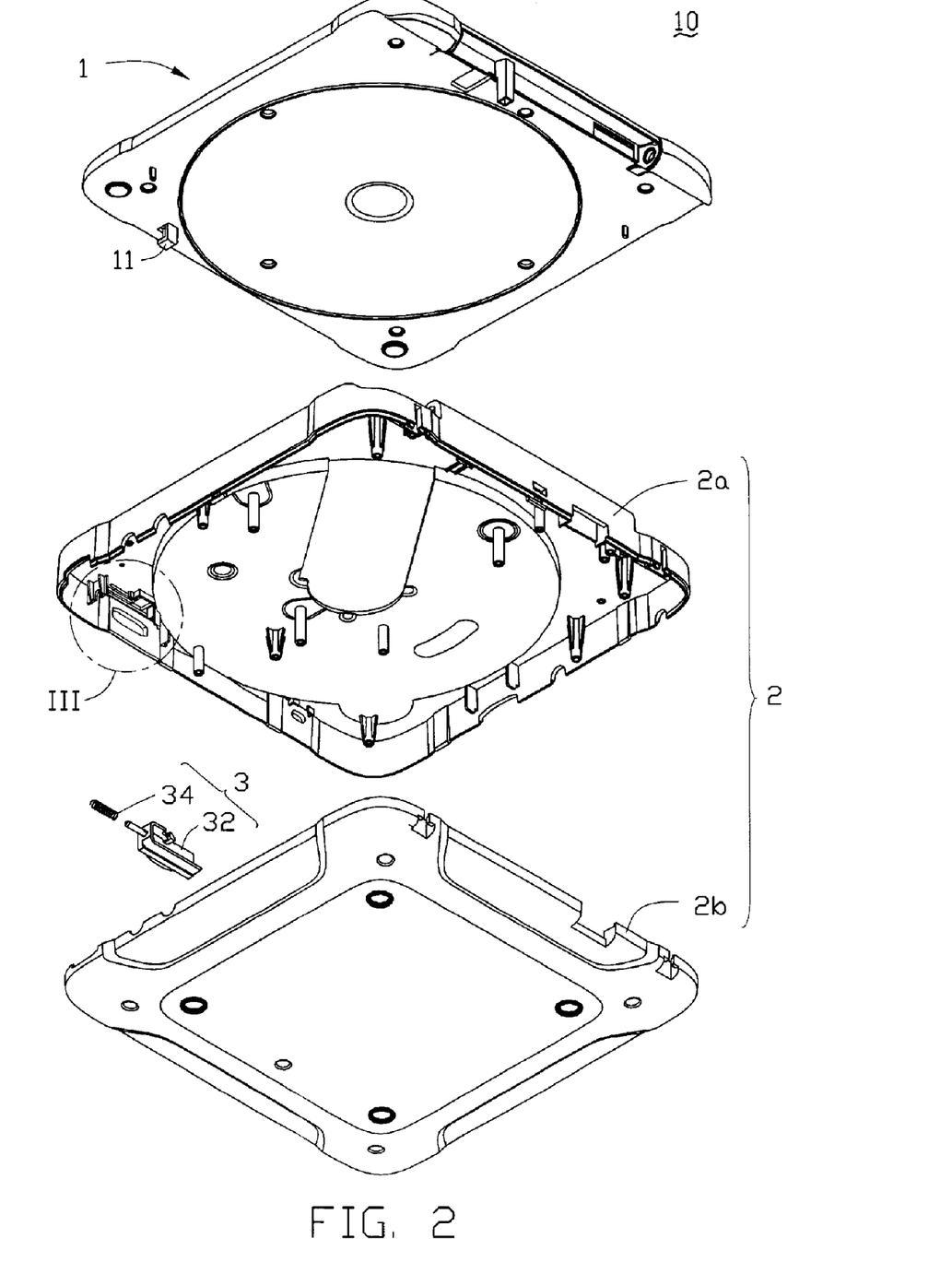
FIG. 2 is an exploded, isometric view of the disc player of FIG. 1, the base including an upper housing and a lower housing.

Referring to FIG. 1 and FIG. 2, a disc player 10 with an opening and closing mechanism 3 is illustrated. The disc player 10 includes a lid 1 and a base 2. The base 2 is a main body of the disc player 10, and in charge of reproducing and/or recording information from and/or onto a disc (not shown). The lid 1 is releasably pivoted to the base 2 to expose the interior of the disc player 10, in order for the placement or removal of the disc in relation to the base 2. An opening and closing mechanism 3 is secured to the base 2 for releasing and clasping the lid 1 in relation to the base 2.

The lid 1 downwardly forms a hook 11 at a front corner thereof. Corresponding to the hook 11, the opening and closing mechanism 3 is mounted to a corresponding corner of the base 2. The base 2 includes an upper housing 2a, a lower housing 2b, and a reproducing and/or recording module 20 received between the upper housing 2a and the lower housing 2b.

Figure 3:
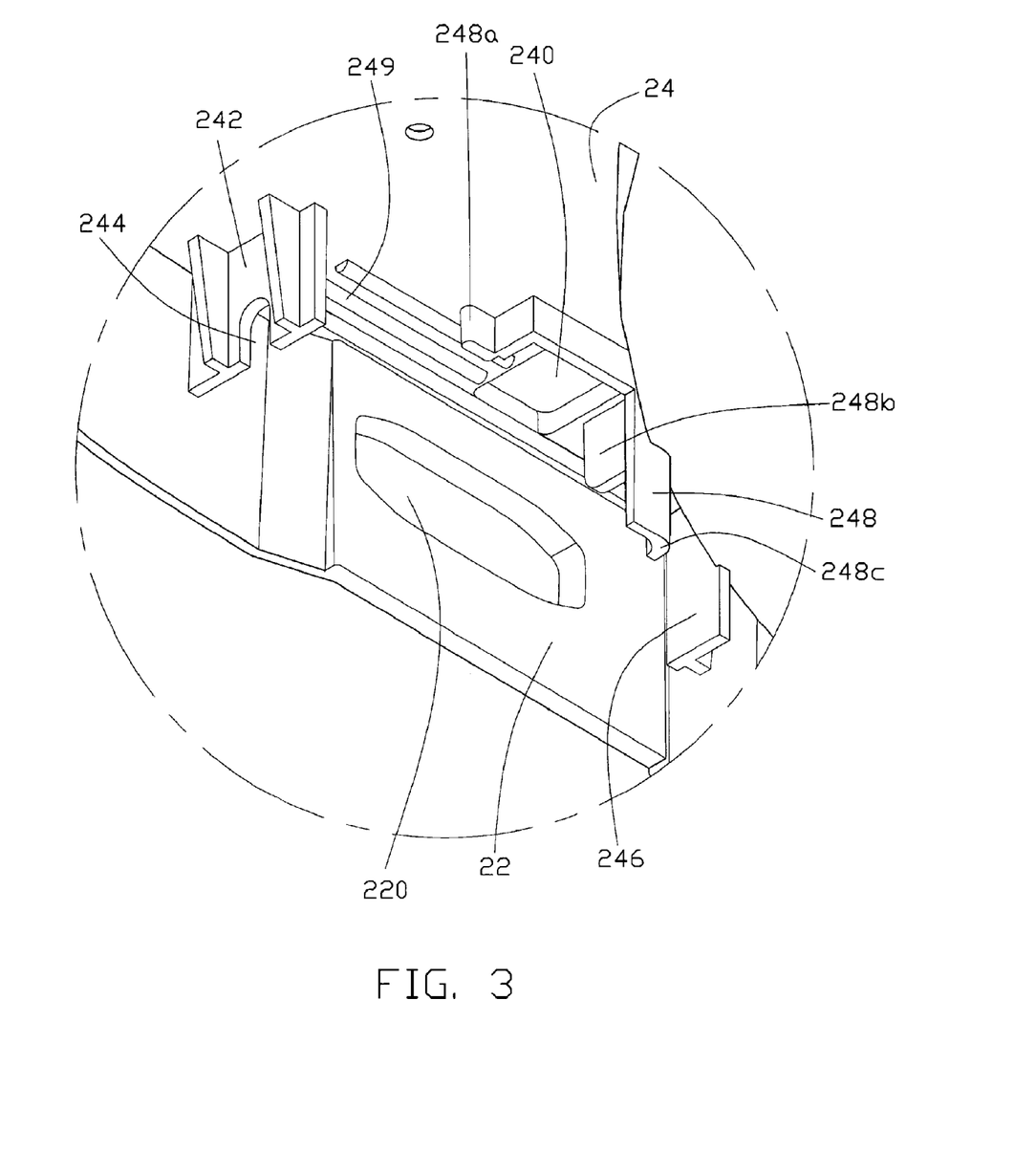
FIG. 3 is an enlarged view of a circled portion III of the upper housing in FIG. 2.

Also referring to FIG. 3, a side plate 22 of the upper housing 2a defines a pushing hole 220 therein. A top plate 24 of the upper housing 2a defines a clasping hole 240 near the pushing hole 220 to allow the hook 11 of the lid 1 to extend therethrough. A first baffle plate 242 and a second baffle plate 246 are respectively attached to the top plate 24, and spaced apart from each other by the clasping hole 240. The first and second baffle plates 242 and 246 perpendicularly extend downwardly from the top plate 24. A notch 244 is defined in a bottom of the first baffle plate 244. A limiting plate 248, including three limiting portions 248a, 248b, and 248c for limiting different portions of the opening and closing mechanism 3, is formed beside the clasping hole 240. The opening and closing mechanism 3 is restricted between the limiting plate 248 and the side plate 22. A pair of ribs 249 is formed on the top plate 24 between the first and second baffle plates 242 and 246.

Figure 4:
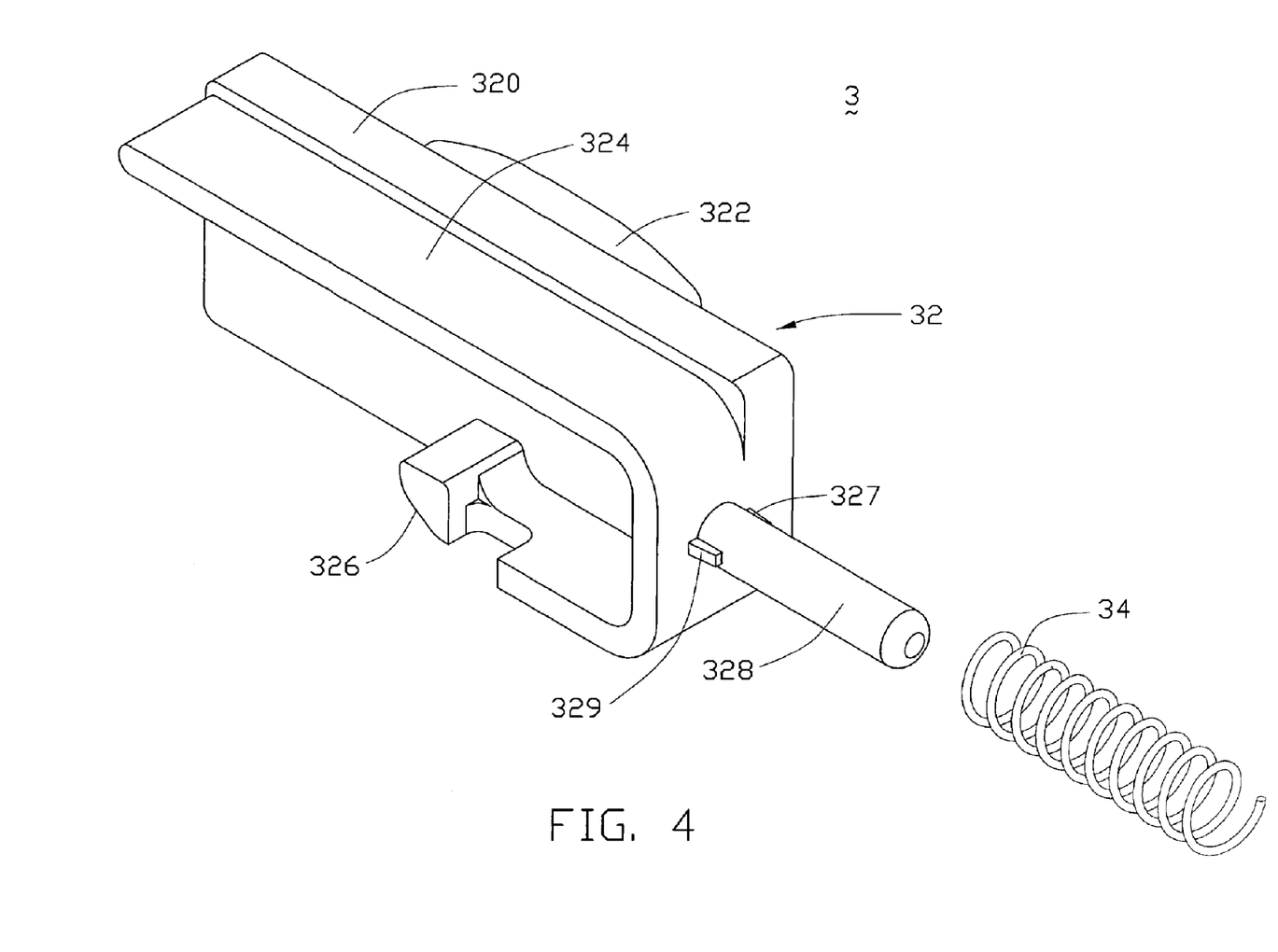
FIG. 4 is an enlarged view of the opening and closing mechanism.

Referring to FIG. 4, the opening and closing mechanism 3 includes a pushing button 32 and a compression spring 34. The pushing button 32 extends through the compression spring 34, and fixes the compression spring 34 thereon.

The pushing button 32 includes a main portion 320, a pushing portion 322, an extending portion 324, a locking portion 326, and a mounting portion 328. The pushing portion 322 and the extending potion 324 respectively extend from two opposite sides of the main portion 320. The mounting portion 328 extends from a lateral side of the extending portion 324 to be sleeved on by the compression spring 34.

The pushing portion 322 is used for applying a pushing force thereon to move the pushing button 32. The pushing portion 322 has a shorter length than that of the pushing hole 220. That is, the pushing button 322 is receivable and movable in the pushing hole 220. The extending portion 324 extends perpendicularly from three adjacent edges of the main portion 320. The locking portion 326 also extends perpendicularly from the main portion 320, and connects to the extending portion 324. The locking portion 326 is used to clasp the hook 11 of the lid 1, when the hook 11 extends through the clasping hole 240.

The mounting portion 328 is a round pin, and can extend through the notch 244 of the upper cover 2a. A diameter of the mounting portion 328 is smaller than an inner diameter of the compression spring 34, while an outer diameter of the compression spring 34 is larger than that of the notch 244. A pair of wedged portions 327 extends along a radial direction of the mounting portion 328. The wedged potions 327 are formed at conjunctions of the main portion 320, the extending portion 324, and the mounting portion 328. A bevel 329 of each wedged portion 327 is inclined to the radial direction of the mounting portion 328. A largest diameter of an imaginary circle across the bevels 329 is larger than that of the inner diameter of the compression spring 34. That is, the compression spring 34 can be firmly fixed on the wedged portions 327.

In assembly of the opening and closing mechanism 3, the mounting portion 328 extends through the compression spring 34. When the compression spring 34 reaches the wedged portions 327, the compression spring 34 is gradually interfered in by the wedged portions 327. As a result, one end of the compression spring 34 is fixed, and the other end thereof is free.

Figure 5:
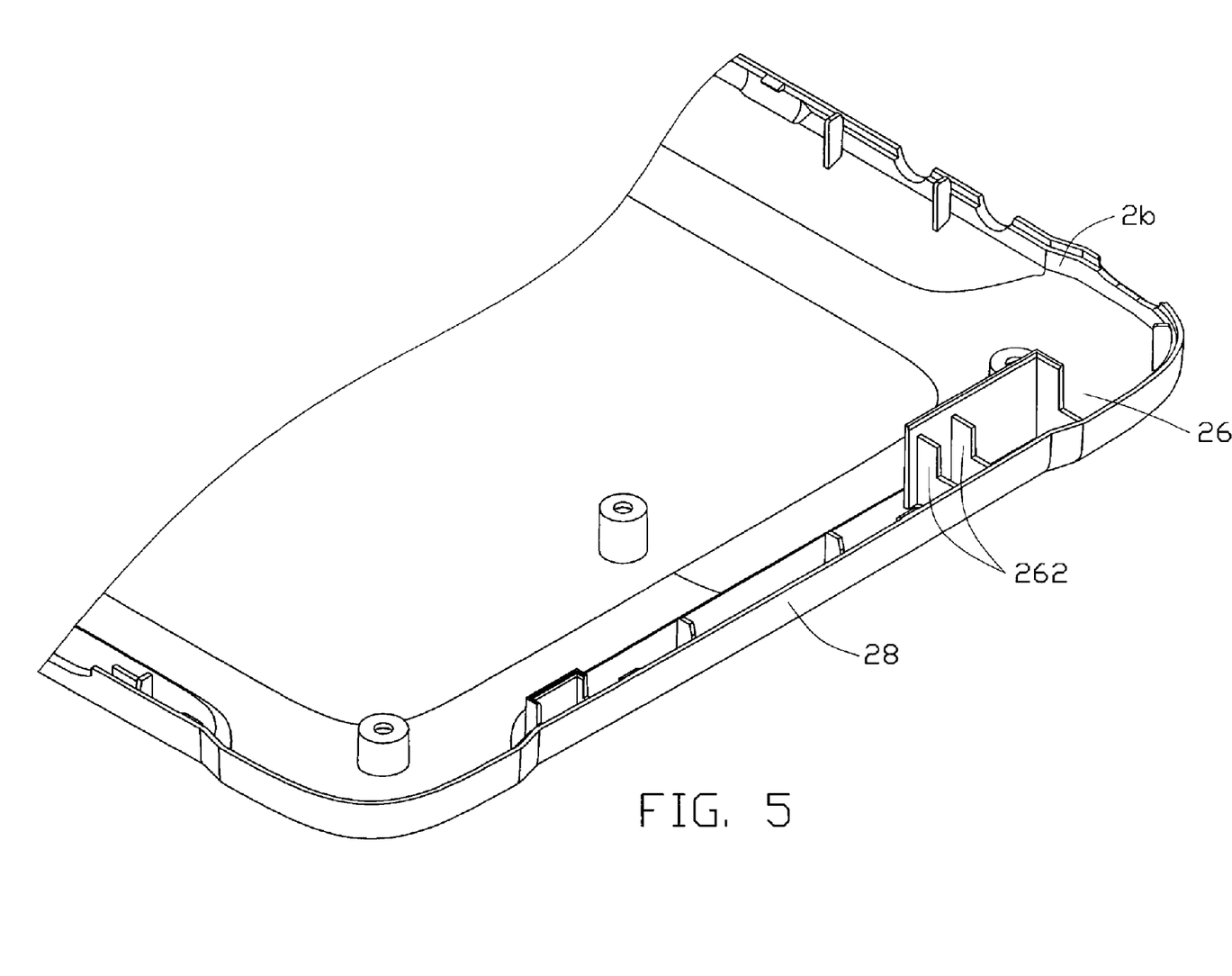
FIG. 5 is a partial, isometric view of the lower housing of FIG. 2, viewed from an inverted aspect.

Referring to FIG. 5, the lower housing 2b forms a plurality of supporting plates 262 from a bottom plate 26 thereof. The supporting plates 262 extend to a side plate 28 of the lower housing 2b. The supporting plates 262 correspond to the opening and closing mechanism 3, and support the opening and closing mechanism 3.

Figure 6:
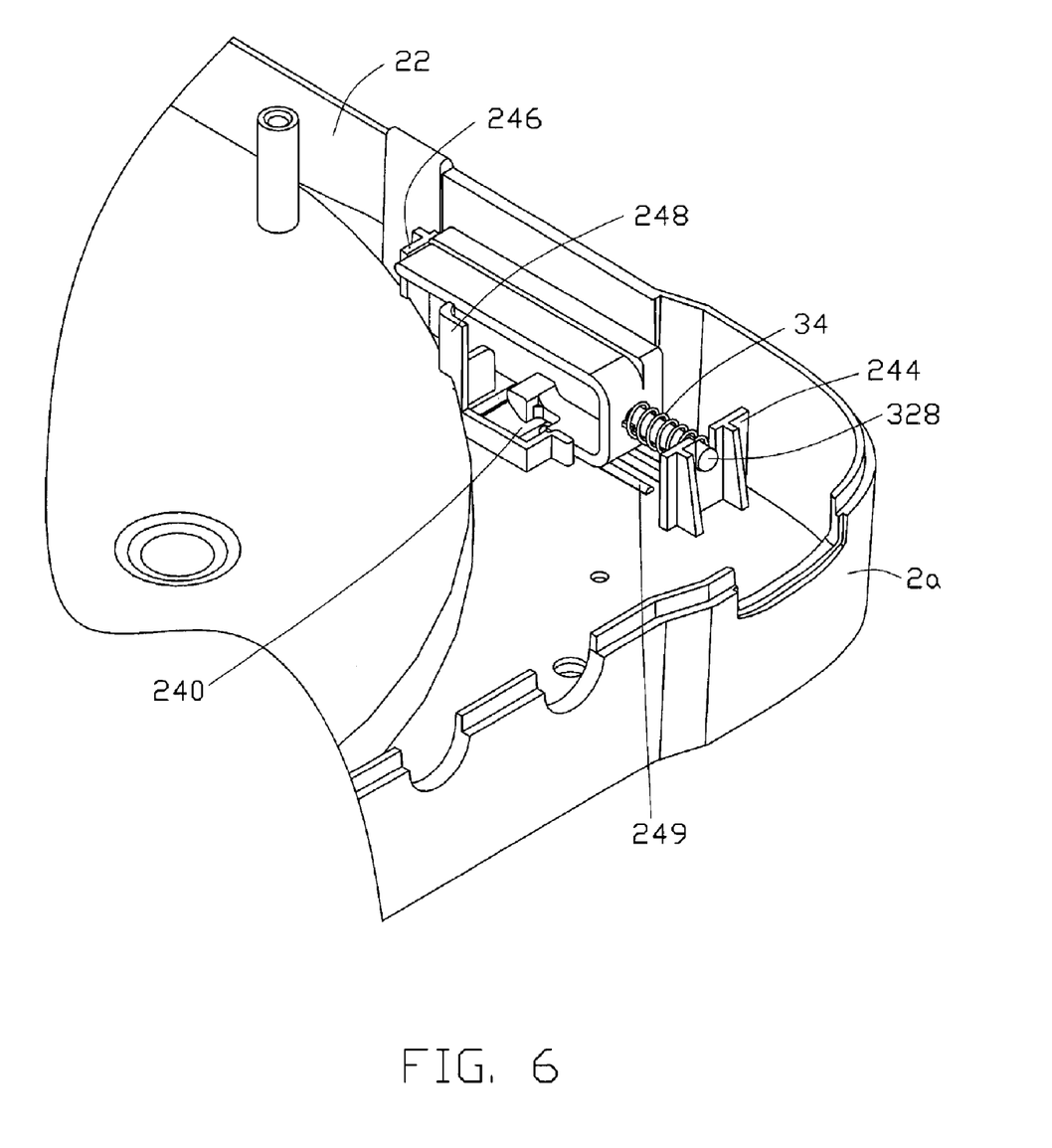
FIG. 6 is a partial, isometric view of the upper housing with the opening and closing mechanism assembled thereto, viewed from an inverted aspect.

Referring to FIG. 6, during assembly of the disc player 10, the compression spring 34 of the assembled opening and closing mechanism 3 is compressed to exhibit a distal end of the mounting portion 328. The exhibited end of the mounting part 328 is set in the notch 244 of the first baffle plate 242, while the main portion 320 of the pushing button 32 is pressed to be forced into the upper housing 2a. After that, the pushing portion 322 of the opening and closing mechanism 3 is received in the pushing hole 220, and the pushing button 32 is retained at an initial position under a restoration force applied by the compression spring 34. The opening and closing mechanism 3 is thus secured to the upper housing 2a. Finally, the lower housing 2b is coupled to the upper housing 2a. After assembly, the pushing button 32 is fixed in three inter-perpendicular directions by the first and second baffle plates 242 and 246, by the limiting plates 248 and the side plate 22, and by the ribs 249 and the supporting plates 262 respectively.

When closing the disc player 10, the lid 1 is forced downwardly, and the hook 11 of the lid 1 reaches the opening and closing mechanism 3 after running through the clasping hole 240. The hook 11 applies force onto the locking portion 326 of the pushing button 32 to move the pushing button 32 in the pushing hole 220. The hook 11 is then suddenly clasped by the locking portion 326 due to a restoration force of the compression spring 34. When opening the disc player 10, a pushing force is applied on the pushing portion 322 of the pushing button 32 to make the pushing portion 322 move along the pushing hole 220, and the compression spring 34 is further compressed. The locking portion 326 is divorced from the hook 11, and the lid 1 is finally released. Once the pushing force is removed, the opening and closing mechanism 3 will restore to the initial position under the restoration force of the compression spring 34.

As described above, the opening and closing mechanism 3 forms the wedged portions 327 on the mounting portion 328 to easily fix the compression spring 34 and secure the opening and closing mechanism 3 to the upper housing 2a. In alternative embodiments, the mounting portion 328 may forms the three wedged portion at uniform intervals, or forms a wedged portion around the mounting portion 328. The three limiting portions 248a, 248b, and 248c respectively restrict one edge of the extending portion 324, one side of the main portion 320, and another edge of the extending portion 324. This configuration induces more steady guidance of the pushing button 32.

It should be emphasized that the above-described embodiments of the present invention, including any preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. A disc player comprising:
   a base receiving a core of the disc player therein;
   a lid rotatably pivoted to the base, the lid forming a hook thereon; and
   an opening and closing mechanism detachably engaged with the hook for releasing the lid from the base, the opening and closing mechanism secured to the base, the opening and closing mechanism comprising:
   a compression spring providing a restoration force; and
   a pushing button for applying a pushing force thereon, the pushing button including at least one wedged portion for interfering in one end of the compression spring to fix the compression spring.

2. The disc player as claimed in claim 1, wherein a first baffle plate and a second baffle plate are formed on the base to confine the opening and closing mechanism therebetween.

3. The disc player as claimed in claim 1, wherein the pushing button comprises a pushing portion for applying a pushing force thereon.

4. The disc player as claimed in claim 3, wherein the base defines a pushing hole therein to receive and guide the pushing portion therein.

5. The disc player as claimed in claim 1, wherein the base defines a clasping hole therein for the hook extending therethrough.

6. The disc player as claimed in claim 1, wherein the base includes a limiting plate and a side plate, the limiting plate and the side plate adapted to restrict the opening and closing mechanism therebetween.

7. The disc player as claimed in claim 1, wherein the base forms at least two ribs and a plurality of supporting plates, and the ribs and supporting plates restrict the opening and closing mechanism therebetween.

8. A disc player comprising:
   a base;
   a lid rotatably pivoted to the base; and an opening and closing mechanism secured to the base, the opening and closing mechanism comprising:

a compression spring providing a restoration force; and a pushing button for applying a pushing force thereon, the pushing button including a locking portion for releasing the lid from the base and clasping the lid to the base, and at least one wedged potion for interfering in one end of the compression spring to fix the compression spring.

9. The disc player as claimed in claim 8, wherein a hook extends from the lid for being clasped or released by the opening and closing mechanism.

10. The disc player as claimed in claim 9, wherein the base defines a clasping hole therein for the hook extending therethrough.

11. The disc player as claimed in claim 8, wherein the base forms at least two ribs and a plurality of supporting plates, and the ribs and supporting plates restrict the opening and closing mechanism therebetween.

12. The disc player as claimed in claim 8, wherein a first baffle plate and a second baffle plate are formed on the base to confine the opening and closing mechanism therebetween.

13. The disc player as claimed in claim 8, wherein the pushing button comprises a pushing portion for applying a pushing force thereon.

14. The disc player as claimed in claim 8, wherein the base defines a pushing hole therein to receive and guide the pushing portion therein.

* * * * *